US006011955A

United States Patent [19]

Tsuchiyama

[11] Patent Number: 6,011,955

[45] Date of Patent: Jan. 4, 2000

[54] TIME CORRECTION MENU FOR A SELECTIVE CALL RECEIVER

[75] Inventor: Kinya Tsuchiyama, Sizuoka, Japan

[73] Assignee: NEC Corporation, Tokyo, Japan

[21] Appl. No.: 08/911,739

[22] Filed: Aug. 15, 1997

[30] Foreign Application Priority Data

Aug. 15, 1996 [JP] Japan .................................... 8-215699

[51] Int. Cl.$^{7}$ ........................................................ H04B 7/26

[52] U.S. Cl. ........................... 455/38.4; 455/70; 455/502; 340/825.44

[58] Field of Search .................................. 455/38.1, 38.2, 455/38.3, 38.4, 38.5, 502, 503, 13.2, 70, 71, 69; 340/825.44, 311.1; 368/10, 47

[56] References Cited

U.S. PATENT DOCUMENTS

| | | | |
|---|---|---|---|
| 5,261,118 | 11/1993 | Vanderspool, II et al. | 455/69 |
| 5,422,863 | 6/1995 | Minowa et al. | 368/47 |
| 5,444,672 | 8/1995 | Kushita | 368/47 |
| 5,710,975 | 1/1998 | Bernhardt et al. | 455/38.3 |
| 5,739,762 | 4/1998 | Kuramatsu et al. | 455/38.1 |

FOREIGN PATENT DOCUMENTS

| | | |
|---|---|---|
| 3-126331 | 5/1991 | Japan . |
| 3-126332 | 5/1991 | Japan . |

*Primary Examiner*—Reinhard J. Eisenzopf
*Assistant Examiner*—Lester G. Kincaid
*Attorney, Agent, or Firm*—Scully, Scott Murphy & Presser

[57] ABSTRACT

A radio selective call receiver includes a synchronous data detector for detecting synchronous data for each unit of a series of a predetermined number of data formed by dividing the transmitted signal into a plurality of parts. A time counter performs time setting and produces time information. A time information comparator compares the synchronous data from the synchronous data detector with the time information from the time counter to calculate an error, and the time counter is corrected on the basis of the error output of the time information comparator. A display displays a time correction interval menu comprising a plurality of different time intervals, and switches enable the selection of a specific time interval, after the expiration of which the time information of the time counter is corrected on a regular basis. This arrangement enables a selection of one of the plurality of different time intervals, to change the time interval after which the time information of the time counter is corrected.

5 Claims, 5 Drawing Sheets

TIME CORRECTION MENU FOR A SELECTIVE CALL RECEIVER

FIELD OF THE INVENTION

The present invention relates to a radio selective call receiver and particularly to a radio selective call receiver with a display function and a time correction function.

BACKGROUND OF THE INVENTION

In conventional radio selective call receivers, the time is in an unset state until a power supply is turned on. Therefore, after the power supply is put to work, a user of the radio selective call receiver performs time setting. In general, a time counter provided within such a radio selective call receiver creates a count error, causing the time to be gradually deviated from the correct time during use of the radio selective call receiver. For this reason, the user per se, each time when he or she uses the radio selective call receiver, should correct the time. Further, in the case of a fully synchronous signal system, a signal is transmitted in a given cycle in time unit, and real-time data is set in a predetermined position of the signal. Therefore, receipt of the time data by a radio selective call receiver permits the timing error of the time counter within the radio selective call receiver to be corrected and the corrected time to be indicated on a display section.

In the conventional radio selective call receiver, however, each time when the time after setting is deviated from the correct time, the user per se, in use of the receiver, should correct the time. This is troublesome. On the other hand, for the fully synchronous signal system, since the signal is transmitted in a given cycle time unit, the time correction is not performed until next time data is received. Further, when the time data is not transmitted or cannot be received, the time cannot be corrected until next time data is recognized, raising a problem that the time remains deviated from the correct time during this period.

SUMMARY OF THE INVENTION

Accordingly, an object of the present invention is to provide a radio selective call receiver which enables time information to be corrected at short time intervals during use of the radio selective call receiver to increase the accuracy of the clock in the radio selective call receiver and, at the same time, can realize automatic correction of the time information without the necessity for the user to perform troublesome manual correction of the time.

According to the invention, a radio selective call receiver for receiving a signal, transmitted in a given cycle in time unit, with synchronous data being set in respective predetermined positions, comprises:

- synchronous data detection means for detecting synchronous data set for each unit of a series of a predetermined number of data formed by dividing said transmitted signal into a plurality of parts;
- a time counter for performing time setting and producing time information;
- time information comparison means for comparing synchronous data from the synchronous data detection means with time information from the time counter to calculate an error; and
- time information correction means for correcting the time information of the time counter so as to correct the error based on the output of the time information comparison means.

BRIEF DESCRIPTION OF THE DRAWINGS

The invention will be explained in more detail in conjunction with appended drawings, wherein.

DESCRIPTION OF PREFERRED EMBODIMENTS

A radio selective call receiver in the preferred embodiment according to the invention will be explained in FIGS. 1 to 5.

Figure 1:
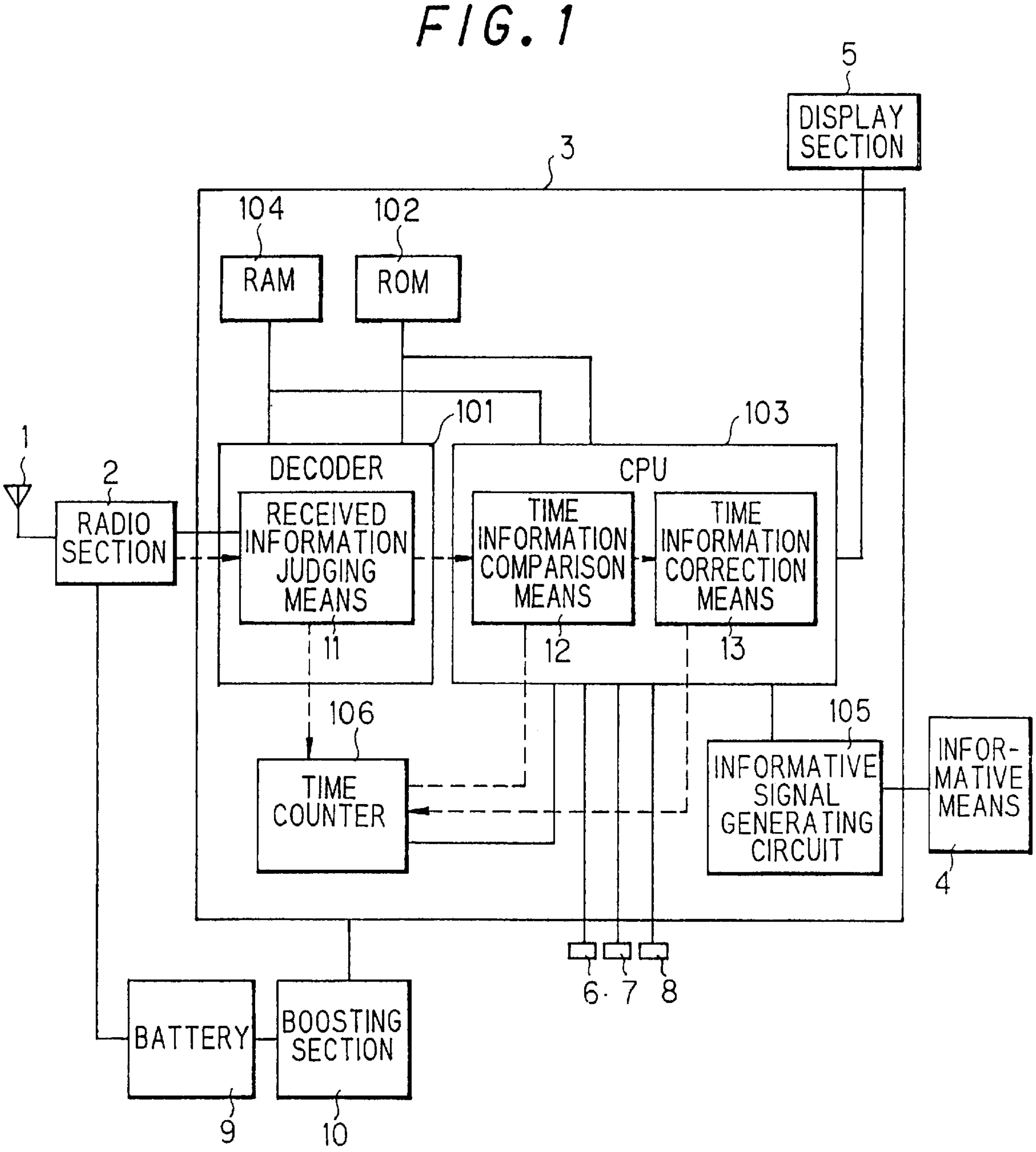
FIG. 1 is a block diagram showing a radio selective call receiver according to one embodiment of the present invention.

FIG. 1 is a block diagram showing the radio selective call receiver of the present invention. In the drawing, numeral 1 designates an antenna, numeral 2 a radio section for amplifying and demodulating a signal received through the antenna 1, and numeral 3 a control section provided with a decoder which compares an individual identification signal in the demodulated signal with an individual identification signal registered in the receiver and, when these signals are in agreement with each other, outputs a receipt signal. Numeral 102 designates a read-only memory (hereinafter referred to as "ROM") as a memory for storing individual identification signals of the receiver, and numeral 103 a microprocessor (hereinafter referred to as "CPU") which functions to instruct a received alarm signal generation circuit 105 to give an instruction to generate a receipt informative signal based on the received signal. Numeral 4 designates informative means for performing a report based on the instruction.

Numeral 11 designates received information judging means which is provided in a decoder 101 and judges whether or not the numbered data of the received signal is information previously set in the receiver. That is, it is received information judging means as synchronous data detection means which detects time data set for each unit of a series of a predetermined number of data formed by dividing said transmitted signal into a plurality of parts in the manner described below. Numeral 12 designates time information comparison means, provided in the CPU 103, for comparing the number data receipt timing information with the time information of the receiver, and numeral 13 time information correction means for correcting the time information of the receiver based on the results of the comparison. Further, numeral 106 designates a time counter, numeral 9 a battery as a d.c. power supply, and numeral 10 a boosting section which boosts the d.c. voltage of the battery 9 and supplies the boosted voltage into the control section 3. Numeral 104 designates a random access memory (hereinafter referred to as "RAM") as a memory for reading and writing a message signal or the like.

Next, the function of the radio selective call receiver according to the present invention will be described. At the outset, a signal transmitted from a transmitter is supplied into the radio section 2 through the antenna 1 and demodulated. The radio section 2 is in operation while receiving the supply of a power supply voltage from the battery 9. The signal, which has been demodulated in the radio section 2, is decoded in the control section 3 and, when found to be in agreement with an individual identification signal given to the radio selective call receiver, informs the user of the call by the informative means 4, such as lighting of a light emitting diode, singing, or vibration. At the same time, when there is a received message, the message is indicated on the display section 5 and, in addition, the contents are recorded in RAM 104 in the control section 3.

The user can read out anytime the contents of the message by depressing a switch 7 or a switch 8. A switch 6 is a menu switch for entry into a menu mode for setting various functions, and depression of the switch 6 permits return to one screen before. The switch 7, when the mode is in menu, serves as an ascertainment switch for selection, and, when depressed in a stand-by state, can read messages in order of the receipt of the message. The switch 8, when the mode is in menu, serves as a switch for selection and, when depressed in a stand-by state, can read messages in order of from the newest message towards the oldest message.

The receiver of this embodiment will be described in more detail. The decoder 101 compares the individual identification signal output from the radio section 2 with the individual identification signal stored in ROM 102 and, when both signals are in agreement with each other, sends a receipt signal to CPU 103. Upon receipt of the receipt signal, CPU 103 instructs the receipt alarm informative signal generating circuit 105 to generate a receipt informative signal. As a result, the receipt alarm informative signal generating circuit 105 sends a receipt informative signal to informative means 4 and generates singing or vibration as described above. If a message follows the individual identification signal output from the radio section 2, the decoder 101 transmits the message signal to CPU 103. In CPU 103, the message signal is converted to a letter font signal which is sent to and indicated on the display section 5. At the same time, as described above, CPU 103 stores the message signal in RAM 104. A time counter 106 for counting the time is connected to the decoder 101.

The receipt information judging means 11 in the decoder 101 judges whether or not the numbered data detected from the transmitted data (a given cycle signal in time unit) is preset information, and, in CPU 103, the time information comparison means compares the receipt timing of the numbered data as synchronous data (synchronous timing signal) with the time information of the receiver, that is, the count output of the time counter 106, followed by correction of the time information by the time information correction means based on the results of the comparison. That is, when the radio section 2 detects the receipt of the numbered data, the receipt information judging means 11 sends receipt timing to the time information comparison means and, at the same time, time information is sent from the time counter 106 to the time information comparison means 12. The time information comparison means 12 compares the receipt timing with the time information, calculates the difference, and sends the results to the time information correction means 13. The time information correction means 13 corrects the time information based on the results, sends the results of the correction to the time counter 106 to correct the time information in the time counter 106, and indicates the corrected time information on the display section 5.

On the other hand, the CPU 103 always monitors the state of three switches, switches 6, 7 and 8, and detects the depression of each switch based on a change of the logic of each switch input terminal to CPU 103 from “HH” to “L.”

Figure 2:
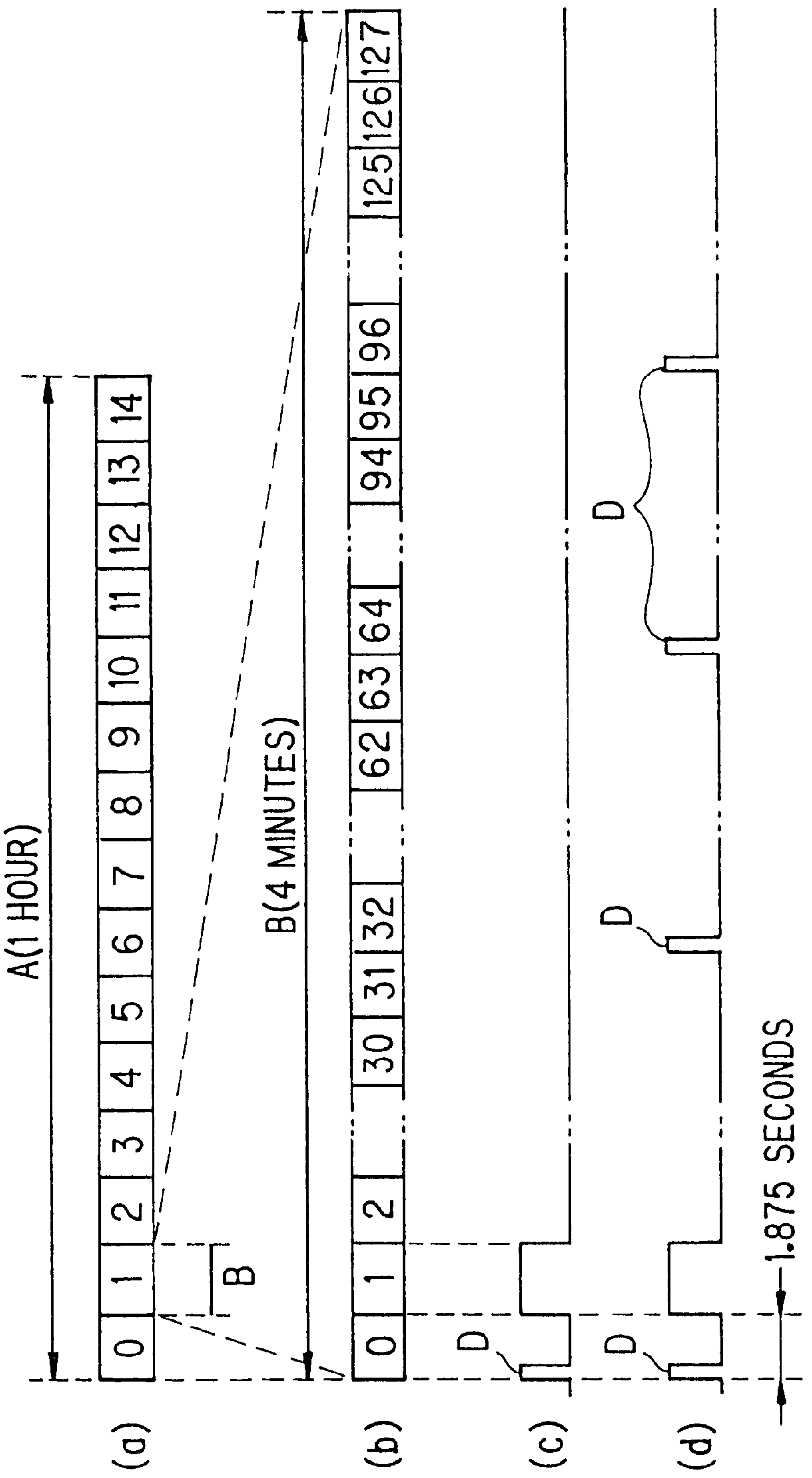
FIG. 2 is a timing chart showing signals in the circuit, shown in FIG. 1, in its each section.

Next, a specific example of the fully synchronous signal transmitted as a signal in a given cycle in time unit and BS timing is shown in FIG. 2. For convenience of explanation, as shown in FIG. 2(*a*), for example, one cycle A of the transmitted data is one hr and divided into 15 parts, and the divided A/15 is, as shown in FIG. 2(*b*), regarded as cycle B which is divided into 128 parts. Numbers 0 to 14 are assigned respectively to fifteen parts created by division of one cycle A, and the numbered parts are designated respectively as A-0, A-1. . . A-14. Further, numbers 0 to 127 are assigned respectively to the 128 parts created by division of B, i.e., A/15, and the numbered parts are designated respectively as B-0, B-1, B-2. . . B-127. Thus, numbered data are present in the transmitted data. B, i.e., A/15, is 4 min, B/128 is 1.875 sec, and individual identification signals, messages and the like in the radio selective call receiver are present in any of B/128 units.

In BS timing shown in FIG. 2, individual identification signals, messages and the like in the radio selective call receiver are present in B-1, and, hence, the radio section 2 is actuated in B-1. Further, as described above, in the case of the fully synchronous signal system, as shown in FIG. 2(*c*), time data D as real-time synchronous data are present in respective given positions of a given cycle signal in time unit, and, in general, time data D is present at the beginning of the given cycle, for example, B-0, in this embodiment. Therefore, this data is monitored to correct the time correction.

According to the present invention, based on the user's setting, time data D for each one cycle is monitored to perform the time correction, and, in addition, the above numbered data in the transmitted data are monitored to detect numbered data for time correction. More specifically, since A/15 is 4 min and B/128 is 1.875 sec, when setting has been made so that the time correction is performed every 4 min, as shown in FIG. 2(*c*), B-0 is monitored. When B-0 has been detected, the time correction is performed. On the other hand, when setting has been made so that the time correction is performed every one min, as shown in FIG. 2(*d*), detection of time data signal in respective cycles B-0, B-32, B-64, and B-96 results in the time correction in this signal generation timing. According to the above judging method, the time correction can be performed every one min, every two min, and every four min, and, when this is combined with 15 divided data of the transmitted data A, a desired time correction interval can be selected within one hour.

Figure 3:
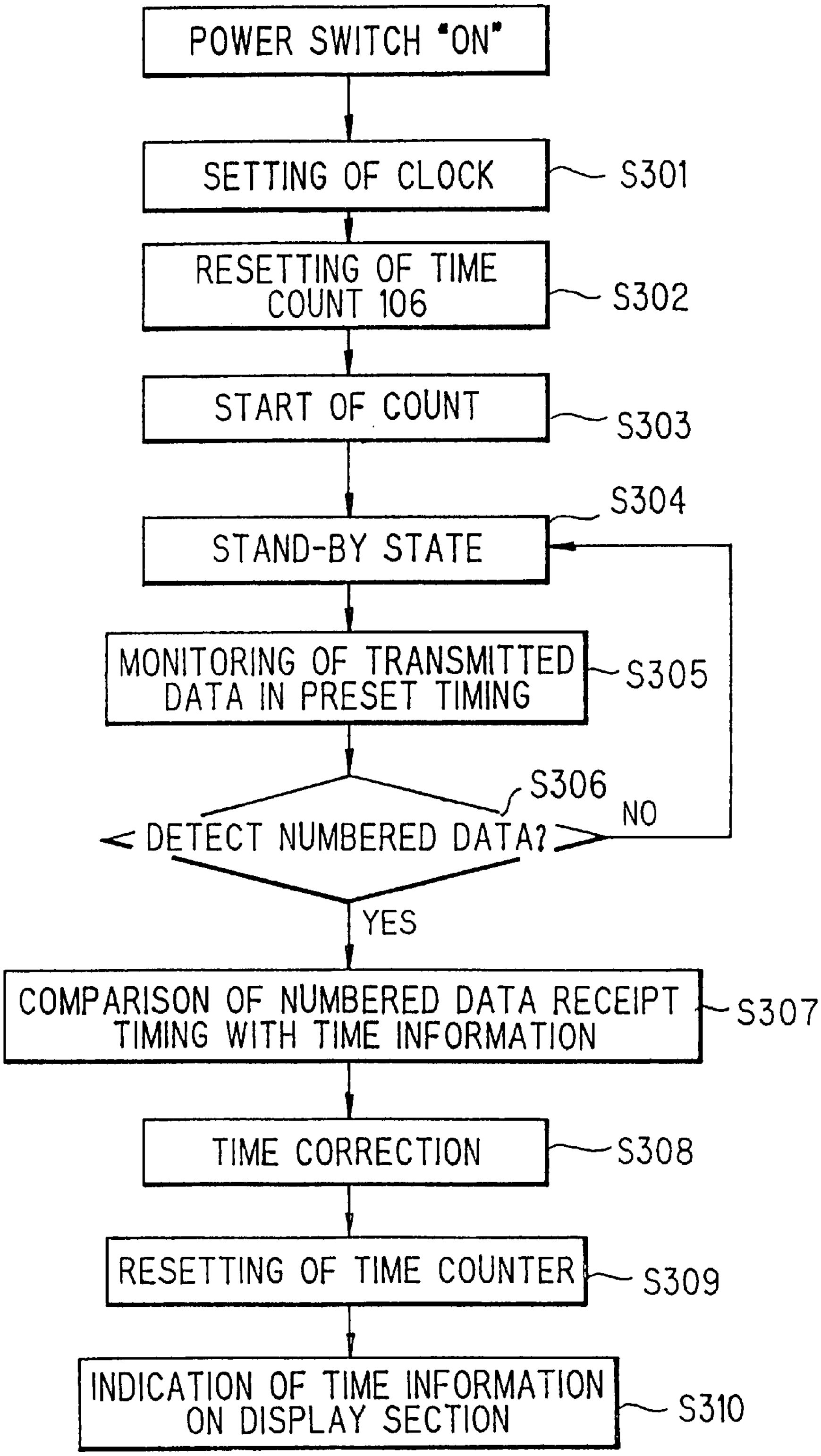
FIG. 3 is a flow chart showing the flow of a time correction operation according to the present invention.

Next, the above function after turning the power switch on will be described in more detail with reference to the flow chart shown in FIG. 3. After the power switch is turned on, the user performs time setting (step S301). The time setting permits the time counter 106 to undergo second resetting (step S302). The time counter 106 restarts counting (step S303). The radio selective call receiver is brought to a stand-by state (step S304). In this state, the transmitted data is monitored at the preset time correction interval (such as one min, two min, or four min) (step S305). Upon detection of the numbered data preset in the transmitted data by the radio selective call receiver (step S306), the receipt timing and the time information of the time counter 106 are compared in CPU 103 (step S307). The time correction is performed based on the results of the comparison (step S308), followed by resetting of the time counter 106 (step S309). After the correction of the time information, the time information is indicated on the display section 5. On the other hand, when the radio selective call receiver has found no numbered data in step S306, it is returned to the stand-by state.

Figure 4:
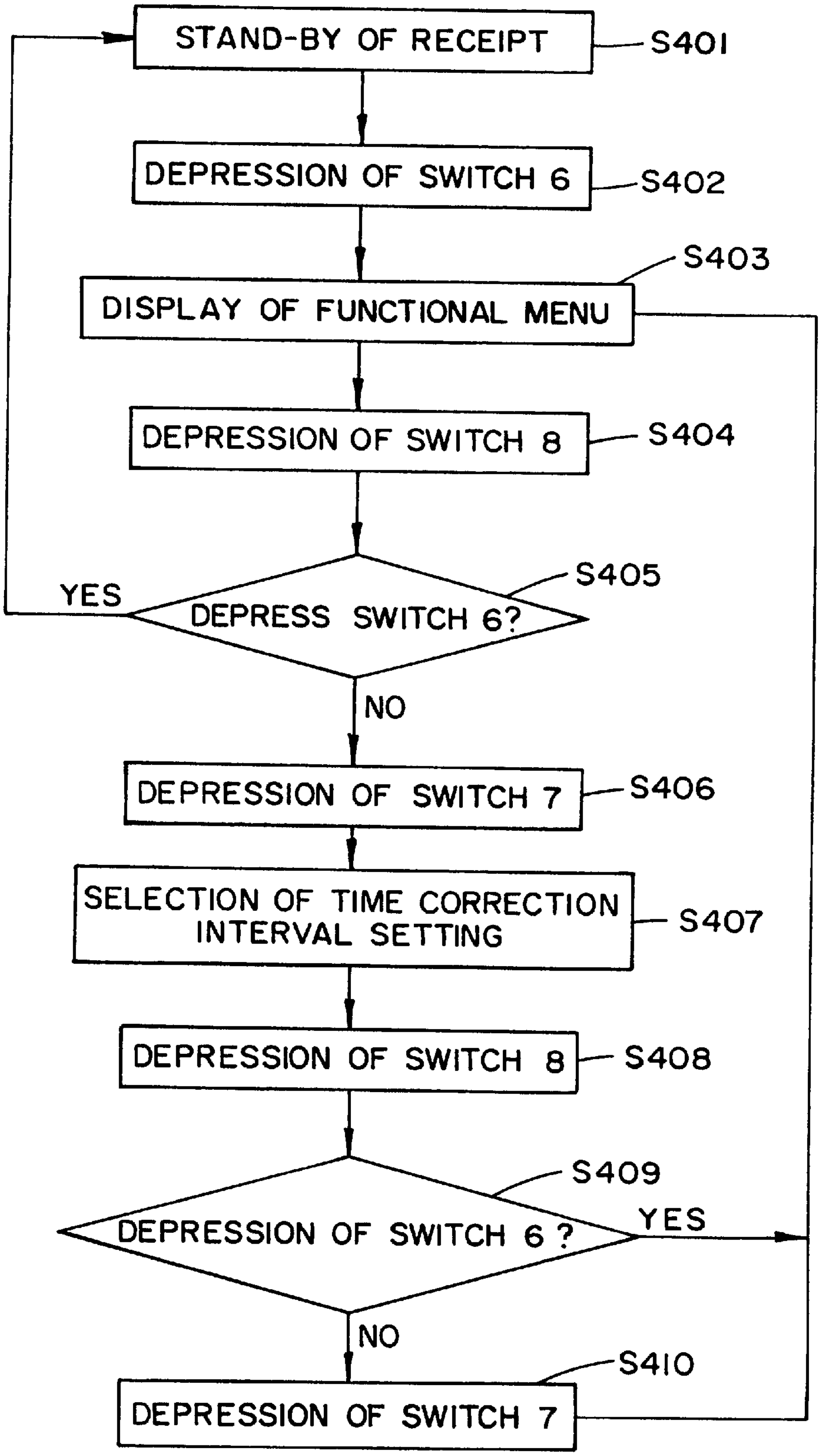
FIG. 4 is a flow chart showing the procedure for setting the time correction interval according to the present invention.
Figure 5:
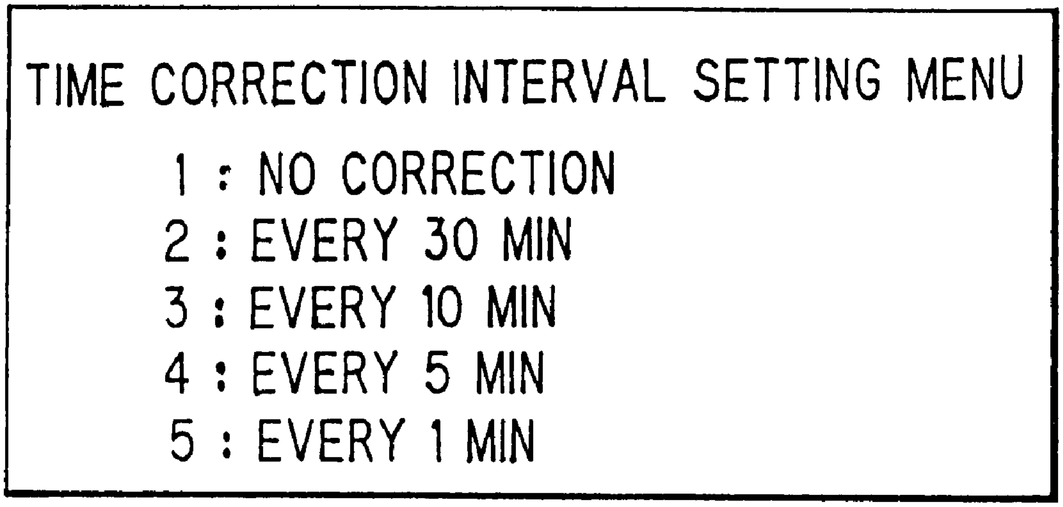
FIG. 5 is an explanatory view showing a time correction interval setting menu indicated on a display in the time correction procedure according to the present invention.

The time correction interval setting method will be described with reference to FIG. 4 (flow chart showing the setting procedure) and FIG. 5 (example of display). In the stand-by state (step S401), upon depression of the switch 6 (step S402), the functional menu is displayed on the display section 5 (step S403). Subsequently, the switch 8 for selection of the menu is depressed to select the menu (step S404). At that time, depression of the switch 6 permits the setting to be interrupted and the receiver to be returned to a stand-by state (step S405). When the selected time correction interval setting menu is displayed followed by depression of the switch 7 for ascertainment (step S406), the selection of the time correction interval setting menu is finished to indicate the time correction interval setting menu selection screen as shown in FIG. 5 on the display section 5 (step S407). Further, the switch 8 for selection of the contents of the setting is depressed to select the time correction interval (step S408). In this case, upon depression of the switch 6, the setting can be interrupted to return the receiver to the stand-by state (step S409). When the switch 7 for ascertainment is depressed (step S410), the time correction interval is decided followed by return to the functional menu.

As described above, the radio selective call receiver according to the present invention comprises: synchronous data detection means for detecting synchronous data set for each unit of a series of a predetermined number of data formed by dividing the transmitted signal into a plurality of parts; a time counter for performing time setting; and time information comparison means for comparing synchronous data from the synchronous data detection means with time information from the time counter to calculate an error, wherein time information correction means is provided for correcting the time information of the time counter so as to correct the error based on the output of the time information comparison means. This constitution enables the correction of the time information at short time intervals during use of the radio selective call receiver, increasing the clock accuracy of the radio selective call receiver. Further, there is no need for the user to perform a troublesome operation of time correction, making it possible to provide a more convenient pager.

Further, the radio selective call receiver according to the present invention is constructed so that the time information correction interval based on the synchronous data can be set by display of time correction interval setting menu and selection of a specific time correction interval menu which can be performed by a switching operation. This realizes time correction with any selected desired clock accuracy.

Furthermore, the radio selective call receiver according to the present invention is constructed so that new time information after the correction of the time information based on the synchronous data is indicated on a display section. Therefore, the user can easily confirm anytime the latest corrected accurate time at the time of or during use of the radio selective call receiver.

The invention has been described in detail with particular reference to preferred embodiments, but it will be understood that variations and modifications can be effected within the scope of the invention as set forth in the appended claims.

What is claimed is:

1. A radio selective call receiver for receiving a signal, transmitted in a given cycle in terms of time unit, with synchronous data being set in respective predetermined positions, said radio selective call receiver comprising:

synchronous data detection means for detecting synchronous data set for each unit of a series of a predetermined number of data formed by dividing said transmitted signal into a plurality of parts;

a time counter for performing time setting and producing time information;

time information comparison means for comparing synchronous data from the synchronous data detection means with the time information from the time counter to calculate an error; and time information correction means for correcting the time information of the time counter so as to correct the error based on the output of the time information comparison means, including time interval selecting means for selecting a time interval, after the expiration of which the time information of the time counter is corrected on a regular basis, and means to enable a selection of one of a plurality of different time intervals, to change the time interval after which the time information of the time counter is corrected.

2. The radio selective call receiver according to claim 1, including a display for displaying the plurality of different time intervals in a time correction interval setting menu, and switches for selection of a specific time correction interval by a switching operation.

3. The radio selective call receiver according to claim 1, wherein the display also displays new time information after the correction of the time information by the synchronous data.

4. The radio selective call receiver according to claim 1, wherein the time interval selecting means includes a display means for displaying a time correction interval setting menu.

5. The radio selective call receiver according to claim 4, wherein the time correction interval setting menu is selected by operation of switch buttons, and the selection of one of the plurality of time intervals is also by operation of the switch buttons.

* * * * *